(12) United States Patent
Svendsen et al.

(10) Patent No.: US 9,032,152 B2
(45) Date of Patent: May 12, 2015

(54) CACHE MISS DETECTION FILTER

(71) Applicants: Kjeld Svendsen, Sunnyvale, CA (US); Gaurav Singh, Los Altos, CA (US)

(72) Inventors: Kjeld Svendsen, Sunnyvale, CA (US); Gaurav Singh, Los Altos, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 238 days.

(21) Appl. No.: 13/848,828

(22) Filed: Mar. 22, 2013

(65) Prior Publication Data

US 2014/0289467 A1    Sep. 25, 2014

(51) Int. Cl.
*G06F 12/08* (2006.01)
*G06F 17/30* (2006.01)

(52) U.S. Cl.
CPC ............ *G06F 17/30* (2013.01); *G06F 12/0802* (2013.01); *G06F 12/0895* (2013.01)

(58) Field of Classification Search
CPC .. G06F 12/0802; G06F 12/0895; G06F 17/30
USPC ....................................................... 711/118
See application file for complete search history.

(56) References Cited

U.S. PATENT DOCUMENTS

| | | |
|---|---|---|
| 6,295,579 B1 | 9/2001 | Sukegawa et al. |
| 6,799,253 B1 | 9/2004 | Peterson |
| 7,685,365 B2 | 3/2010 | Rajwar et al. |
| 8,176,266 B2 | 5/2012 | Kottapalli et al. |
| 8,316,352 B2 | 11/2012 | Lev et al. |
| 8,352,421 B2 | 1/2013 | Little |
| 2006/0085591 A1 | 4/2006 | Kumar et al. |

OTHER PUBLICATIONS

Bonomi et al, An Improved Construction for Counting Bloom Filters, pp. 684-695, 2006.

*Primary Examiner* — Yong Choe
(74) *Attorney, Agent, or Firm* — Amin, Turocy & Watson, LLP

(57) ABSTRACT

Systems and methods are provided that facilitate cache miss detection in an electronic device. The system contains a probabilistic filter coupled to the processing device. A probing component determines existence of an entry associated with a request. The probing component can communicate a miss token without the need to query a cache. Accordingly, power consumption can be reduced and electronic devices can be more efficient.

20 Claims, 10 Drawing Sheets

CACHE MISS DETECTION FILTER

FIELD

This disclosure relates to cache miss detection systems and/or methods, and more particularly to efficient cache miss detection.

BACKGROUND

A Bloom filter is a data structure used for probabilistic representation of a data set. Membership queries, to a Bloom filter, check if an element is a member of the data set. A Bloom filter can incorrectly recognizes an element to be a member of a set (false positive). However in most cases, such false positives are an acceptable tradeoff compared to reduced data storage size and faster lookup time when using a Bloom filter. Bloom filters have been used in database applications to store large amounts of static data and allow reduction in the time it takes to lookup data from a slow storage device to faster main memory.

A cache is a component utilized in computing devices. A cache transparently stores data so that future requests for that data can be served faster. The data that is stored within a cache might be values that have been computed earlier or duplicates of original values that are stored elsewhere, such as in main memory. If requested data is contained in the cache (cache hit), this request can be served by reading the cache, which is generally faster than main memory. Otherwise (cache miss), the data has to be recomputed or fetched from its original storage location (e.g., main memory), which is comparatively slower. Hence, the greater the number of requests that can be served from the cache, the faster the overall system performance becomes.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its purpose is to present some concepts of the specification in a simplified form as a prelude to the more detailed description that is presented in this disclosure.

In an implementation, a processing unit, such as a central processing unit (CPU), microprocessor, non-transitory signal processor, memory controller, and or other device communicates requests or a series of requests. Requests are made by one or more applications, components, and the like. As requests are input, a type of the request can be determined. In an aspect, requests can be read and/or write requests.

In an aspect, a probabilistic filter component can store entries associated with requests. A probing component can probe the probabilistic filter to determine existence of an entry associated with the request. A miss can be communicated without need to query a cache.

In another implementation, the probing component can monitor a history of results for requests, for examples in tables, queues, and the like. In an aspect, the probing component can determine to alter a parameter of the probabilistic filter based on the history.

Accordingly, latency associated processing and/or accessing memory can be decreased, power consumption can be reduced, overhead can be reduced, heat generation can be reduced, and/or other aspects of efficiency can be increased.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, and advantages of the present invention will be apparent upon consideration of the following detailed description, taken in conjunction with the accompanying drawings, in which like reference characters refer to like parts throughout, and in which.

DETAILED DESCRIPTION

Figure 1:
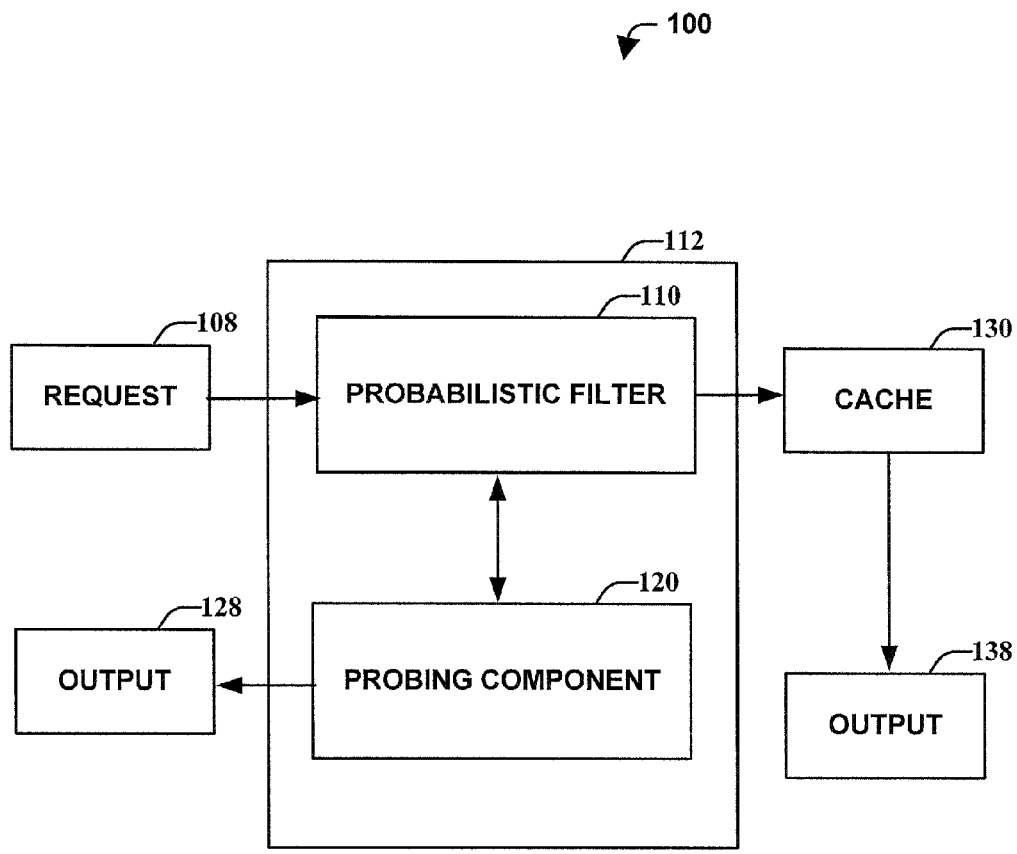
FIG. 1 illustrates a high-level functional block diagram of an example cache miss detection system in accordance with various aspects of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Systems and methods disclosed herein relate to power management in variable input rate devices and/or systems. In one implementation, an input component (e.g., a buffer) receives input and determines an input rate based on the received input. In an aspect, the input rate alters a frequency and a voltage of a device to efficiently manage power consumption. It is appreciated that a variable input rate system can be within larger devices such as smart phones, tablets, e-readers, digital video recorders, mobile music players, personal computers, servers, memory sticks, digital video recorders (DVRs), solid state machines, consumer electronics and the like.

According to one aspect of this disclosure, applications (e.g., software in operation) send requests to a processing unit(s). The processing unit receives the requests as input. As a number of requests alter, a corresponding input rate can alter. In accordance with an aspect, a processing unit can process each request. When an input rate increases, the processing unit can require higher voltages and/or frequencies in order to manage latency and/or processing speed. In another aspect, a decrease input rate can result in a processing unit requiring a reduce need for power.

In this disclosure various systems and methods generally refer to a processors, processing units, memory, memories, a memory device(s), variable input rate device(s), or the like are generally intended to refer to a computer-related entity, either hardware (e.g., a circuit), a combination of hardware and software, and/or an entity storing data, electronically, optically, mechanically or otherwise. For example, a memory may be, but is not limited to being, an electronic memory device storing non-transitory signals via a combination of circuitry and control algorithms.

Generally, the various systems and methods apply to electronic devices comprising a cache. The systems and methods can refer to results, misses/hits, miss tokens, and/or hit tokens. The terms can refer to non-transitory computer readable signals comprising values. In an aspect, a cache can be a computer readable storage medium and/or various computer executable components.

Referring now to FIG. 1, there is illustrated a non-limiting exemplary implementation of a system 100 that provides cache miss detection in accordance with various aspects of this disclosure. The system 100 can comprise a filter component 112 that can comprises a probabilistic filter 110 and a probing component 120. The filter component 112 can receive a request 108 (e.g., from a computer processor). In an aspect, the filter component can communicate an output 128. In another aspect, the filter component 112 can be in communication with a cache 130. The cache 130 can communicate an output 138. While the various components are illustrated as separate components, it is noted that the various components can be comprised in one or more other components. Further, it is noted that the system 100 can comprise additional components not shown for readability. It is also noted that a computer processor can execute the various components and the various components can be stored in a memory, such as a non-transitory computer readable memory and the like, in accordance with various aspects of this disclosure. Additionally, the various components may be contained on one integrated circuit, or on a number of individual circuits coupled together.

In various implementations, the system 100 can be comprised in a larger system. The larger system can comprise smart phones, databases, tablets, e-readers, digital video recorders, mobile music players, personal computers, servers, memory sticks, digital video recorders (DVRs), solid state machines, set top boxes, consumer electronics and the like.

The probabilistic filter 110 can receive the request 108. In an aspect, the request 108 can comprise one or more requests received from a processor, for example. In an aspect, the probabilistic filter 110 can determine a type associated with the request 108. For example, the probabilistic filter 110 can determine whether the request 108 is a write type request or a read type request. In an aspect, a write type request can comprise data instructing the cache 130 to perform a write. In another aspect, a read type request can comprise data instructing the cache 130 to perform a read. While the cache 130 is described as performing reads/writes, it is noted that various components can execute a read/write by utilizing the cache 130. It is noted that various other components (e.g., the probing component 120) can determine a type of the request 108, however this disclosure refers to the probabilistic filter 110 determining a type, herein.

In an implementation, the probabilistic filter 110 can comprise a data structure (e.g., table, tree, queue, array, and the like). The probabilistic filter 110 can further comprise a set of entries. In an aspect, the probabilistic filter 110 can comprise a Bloom filter, and the like. As an example, the data structure can comprise a bit array of m bits, where m is a number. The probabilistic filter 110 can determine k hash functions (wherein k is a number). Each of the k hash functions can hash to (e.g., map) an entry to one of the m array positions. In an aspect, the probabilistic filter 110 can determine k based in part on a size of the cache 130, for example.

In an aspect, the probabilistic filter 110 can add entries (allocate). Allocating entries can comprise indexing the request 108 (or portions of a request, such as a word) by generating a hashing value. Further, allocating entries can comprise adding a hash value associated with the word to the data structure. Continuing with the above example, the probabilistic filter 110 can utilize k hash functions to produce k array positions for the word. The probabilistic filter 110 can set each bit of the k array positions to "1." In an aspect, an entry of the probabilistic filter 110 can be a set of array positions. As an example, each entry can comprise k array positions, and each entry can be a unique combination of the k positions.

In one implementation, the probabilistic filter 110 can allocate a word to the set when it is determined that the request 108 is a write request. In another aspect, the cache 130 can perform a write to write the word (e.g., add a word to the cache).

In an implementation, the probing component 120 can probe (e.g., query) the probabilistic filter 110 for a word associated with the request 108, when it is determined the request 108 is a read type request. The probing component 120 can determine if the word is or is not in the probabilistic cache filter 110. In various implementations, determining a word is in the probabilistic filter 110 can comprise determining the word is definitely not in the probabilistic filter 110 and is therefore definitely not in the cache 130 (e.g., a read request will result in a miss). Thus, the probing component 120 can communicate a miss token (e.g., a miss signal, data indicating a miss, etc.) in the output 128. In an aspect, utilizing the probabilistic filter 110 to determine a miss can avoid unnecessary queries to the cache 130 and thereby conserving power/time, and/or increasing overall performance of the system 100. In another aspect, the system 100 can provide front-end cache miss detection (e.g., early miss detection relative to other systems).

As an example, the probing component 120 can probe the probabilistic filter 110 for a word of the request 108. Probing the probabilistic filter 110 can comprise utilizing k hash functions to produce k array positions for the word and determining if the word is or is not in the probabilistic cache filter 110. In an aspect, the probing component 120 can check a value of each of the k array positions. If any of the k values is a "0,"

then the word is definitely not in the cache 130. If every one of the k values is a "1," then the word is may or may not in the cache 130.

In another aspect, determining the word is in the probabilistic filter 110 can indicate the word may or may not be in the cache 130. In an aspect, the probe component 120 may generate false positive results, wherein a word associated with the request 108 may or may not be in the cache 130 (may or may not result in a hit/miss). As an example, if every one of the k values is a "1," then the word is may or may not in the cache 130. The filter component 112 can communicate a request to the cache 130, when it is determined that the word associated with the request 108 may or may not be in the cache 130. The cache 130 can search for the word (e.g., in pages of the cache 130). If the word is found, the cache 130 can communicate output 138, for example to a processor. In one aspect, the cache 130 can generate the output 138 as a hit token (indicating the word was found) and/or as a responsive value (e.g., read out a value and output the value).

In one aspect, a false positive occurs when the probing component 120 determines that a word associated with the request 108 may or may not be in the cache, and the cache 130 searches for the word and does not find the word. In this example, the cache 130 can generate output as a miss token. The cache 130 can communicate the miss to a processor, the filter component 112, and the like. In an aspect, false positives result from two or more words being hashed to the entry, while one of the two or more words is in the cache 130.

In an implementation, the probabilistic filter 110 can determine the number of k hash functions to utilize and/or functions for the k hash functions. In another aspect, the probabilistic filter 110 can alter the hash functions based on a history of false positive results, positive results, and/or complete miss results. It is noted that the hash functions can be predetermined.

Figure 2:
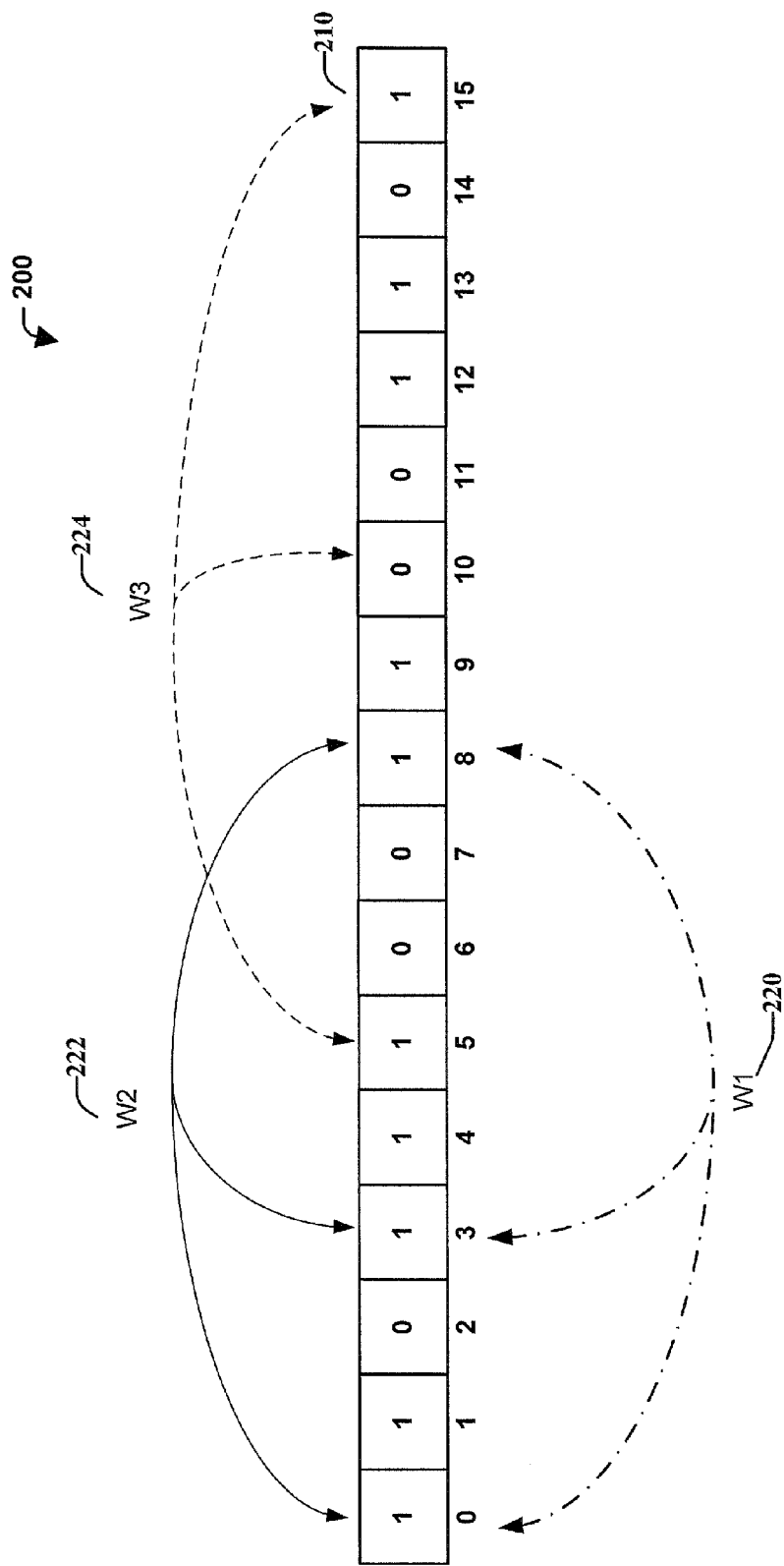
FIG. 2 illustrates a high-level functional block diagram of an example cache miss detection system including an array filter in accordance with various aspects of this disclosure.

Referring now to FIG. 2, with reference to FIG. 1, there illustrated is a non-limiting exemplary implementation of a cache filter system 200 that provides miss detection in accordance with various aspects of this disclosure. The system 200 can comprise an array 210 of j bits, wherein j is a number. In this example, j is depicted as 16 such that each bit has a position 0-15. It is noted that j can be virtually any number but in most implementations is a multiple of two.

In an implementation, the probabilistic filter 110 can comprise the array 210. It is noted that various data structures, algorithms, and the like can be comprised by the probabilistic filter 110, and the array 210 is referred to herein for exemplary purposes.

In another aspect, an entry of the probabilistic filter 110, as used herein, can be a combination of one or more bits of the array 210. For an example, an entry can comprise i array positions, where i is a number. Such as position 0, position 5, and position 6. It is noted that an entry can comprise a single array position to j minus one array positions.

In an implementation, the probabilistic filter 110 can generate a hash for words, such as $W_1$ 220, $W_2$ 222, and $W_3$ 224 based on one or more hash functions. For example, $W_1$ 220 can be hashed to an entry of positions 1, 3 and 8, $W_2$ 222 can be hashed to an entry at positions 1, 3, and 8, and $W_3$ 224 to 5, 10, and 15. As illustrated, the probing component 120 can determine values at each position associated with the entry. If the probing component 120 determines a "0" in any position, (e.g., position 10), then the probing component 120 can communicate a miss token. As an example, probing for $W_3$ 224 would result in a miss because of position 10. In an aspect, once a "0" is found, the probing component need not search any more positions. In another aspect, a read request can be directed to forgo attempting a read from cache.

In another aspect, the probing component 120 can determine an entry has a "1" at each position. Thus, a word associated with a request (e.g., request 108) may or may not be in a cache. In an aspect, one or more words can be hashed to one or more entries. For example, hashing of $W_1$ 220 and $W_2$ 222 can lead to a single entry. It is noted, that each word, $W_1$ 220 and $W_2$ 222, may or may not be in the cache 130.

Figure 3:
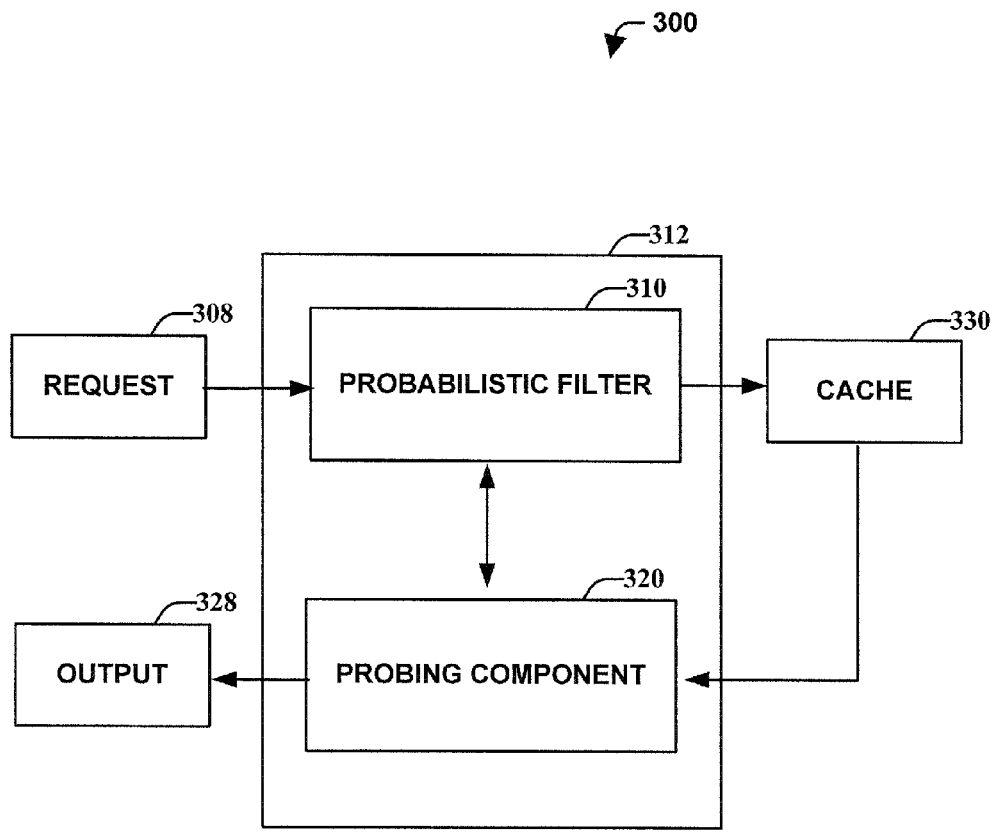
FIG. 3 illustrates a high-level functional block diagram of an example cache miss detection system that can monitor cache results in accordance with various aspects of this disclosure.

Turning to FIG. 3, there is illustrated a non-limiting exemplary implementation of a system 300 that provides cache miss detection in accordance with various aspects of this disclosure. The system 300 can comprise a filter component 312 that can comprise a probabilistic cache filter 310 and a probing component 320. The filter component 312 can receive a request 308 (e.g., from a computer processor). In another aspect, the filter component 312 can be in communication with a cache 330. While the various components are illustrated as separate components, it is noted that the various components can be comprised in one or more other components. Further, it is noted that the system 300 can comprise additional components not shown for readability. It is also noted that a computer processor can execute the various components and the various components can be stored in a memory, such as a non-transitory computer readable memory and the like, in accordance with various aspects of this disclosure. Additionally, the various components may be contained on one integrated circuit, or on a number of individual circuits coupled together.

In various implementations, the probabilistic filter component 310, the request 308, the probing component 320, and the cache 330 can comprise one or more aspects disclosed with reference to the components of FIG. 1.

In an implementation, the cache 330 can attempt a read based on the request 308. The cache 330 can generate a result and communicate the result to the probing component 320. The probing component 320 can monitor results and/or store results (e.g., a count of false positive results, count of hits, etc.). In an aspect, a history of the results can be gathered based on the stored results.

It is noted, that the probing component 320 can determine a threshold, such as a false positive threshold. In an aspect, if the cache 330 communicates a miss token, then the word associated with the result was a false positive result. The probing component 320 can determine when a number of false positive results accedes the threshold for false positive results. In various other examples, the probing component 320 can determine a frequency of false positive results, such as by counting a number of false positive results over a period of time, a number of read attempts, and the like, to be compared with a threshold. In another example, the probing component can determine a number of false positive results for the last x number of requests, wherein x is a number. The probing component can determine f the number of results over the last x numbers reaches a threshold.

In an implementation, the probing component 320 can monitor statistical information such as hit tokens and miss tokens from the cache, words associated with each false positive and/or hit, and entries associated with each false positive and/or hit. In an aspect, the probing component 320 can determine if the monitored statistical information exceeds a threshold.

As an example, the probing component 320 can determine an entry of the probabilistic cache filter 310 has a relatively a high amount of false positives. The probing component 320 can determine to alter hash functions such that false positives are reduced.

In an implementation, the probing component 320 determine to alter at least one hashing functions, alter the probabilistic filter 310, and the like, based on a threshold being reached. As an example, the probing component 320 can determine an amount of false positive results associated with an entry exceeds a threshold. The probing component 320 can alter the hash functions (and/or reinitialize entries based on the hash functions and words in a cache), to alleviate the false positive results.

In another aspect, the probing component 320 can monitor requests in a request queue. A request queue can store one or more requests awaiting processing. In an aspect, the probing component 320 can determine whether requests comprised in the request queue are associated with one or more common word. In an aspect, the probing component 320 can look ahead and determine if a request in the request queue will result in a hit and/or miss. In an aspect, the probing component 320 can determine if a write request will alter the probabilistic filter component 310 and/or the cache 330 such that a hit/miss result of a request may be altered. In an implementation, the probing component 320 can return a miss token for a request in the request queue before the request is processed. Accordingly, one or more requests in the request queues can be removed based on a predicted miss, even before the request is processed.

Figure 4:
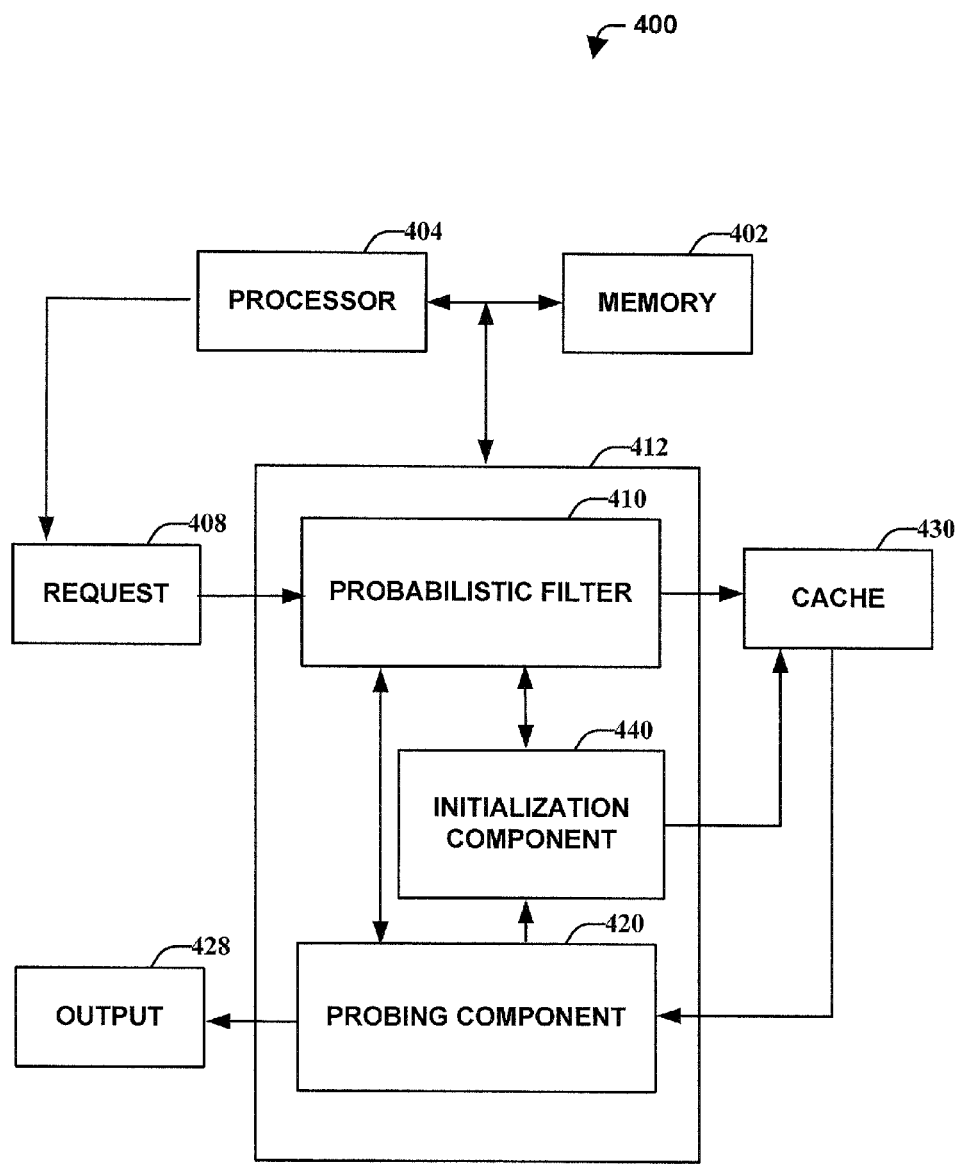
FIG. 4 illustrates an schematic diagram of an example cache miss detection system including an initialization component, a processor and a memory in accordance with various aspects of this disclosure.

Turning now to FIG. 4, there is illustrated a non-limiting exemplary implementation of a system 400 that provides cache miss detection in accordance with various aspects of this disclosure. The system 400 can comprise a memory 402 for storing computer executable components and instructions. A processor 404 can facilitate operation of the computer executable components and instructions by the system 400. In an aspect, the memory can 402 can store and the processor can execute a filter component 412 that can comprises a probabilistic cache filter 410, a probing component 420, and an initialization component 440. The filter component 412 can receive a request 408 (e.g., from a computer processor). In another aspect, the filter component 412 can be in communication with a cache 430. While the various components are illustrated as separate components, it is noted that the various components can be comprised in one or more other components. Further, it is noted that the system 400 can comprise additional components not shown for readability. It is also noted that a computer processor can execute the various components and the various components can be stored in a memory, such as a non-transitory computer readable memory and the like, in accordance with various aspects of this disclosure. Additionally, the various components may be contained on one integrated circuit, or on a number of individual circuits coupled together. In an aspect, the system 400 can comprise functionality related to the systems 100, 200, and 300.

The initialization component 440 can initialize the probabilistic filter 410. In an example, initializing the cache filter 440 can comprise altering the probabilistic filter 410 (e.g., altering entries of the probabilistic cache filter). In another example, initialization component 440 can initialize the cache filter by reading words from the cache 430 and allocating the words to the probabilistic cache filter 410.

In an aspect, the initialization component 440 can restore entries in the probabilistic filter 410 to recover from an error (e.g., power failure). In another aspect, the initialization component 440 can alter the probabilistic filter 410 when the probing component 420 determines a threshold has been met, alters a hashing function, and the like.

As an example, the probing component 420 can determine one or more entries of the probabilistic filter 410 have relatively high amounts of false positive results (e.g., based on past results). The probing component can determine to alter one or more hash functions, such that words associated with the one or more entries of the probabilistic filter 410 have relatively high amounts of false positive results are no longer associated with the same entries. It is noted that the probabilistic component 420 can selectively alter specific hash functions, such that entries not associated with high false positive results need not be altered. In an aspect, the initialization component 440 can selectively initialize entries of the probabilistic filter 410 based on determining what entries are affected by the altered hash functions.

In order to provide for or aid in the numerous inferences (determining, etc.) described herein, the various components can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Any of the foregoing inferences can potentially be based upon, e.g., Bayesian probabilities or confidence measures or based upon machine learning techniques related to historical analysis, feedback, and/or other determinations or inferences.

Referring now to FIGS. 5-8, there are illustrated methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer readable device or storage medium, integrated circuits containing various electrical components, and electronic devices.

Figure 5:
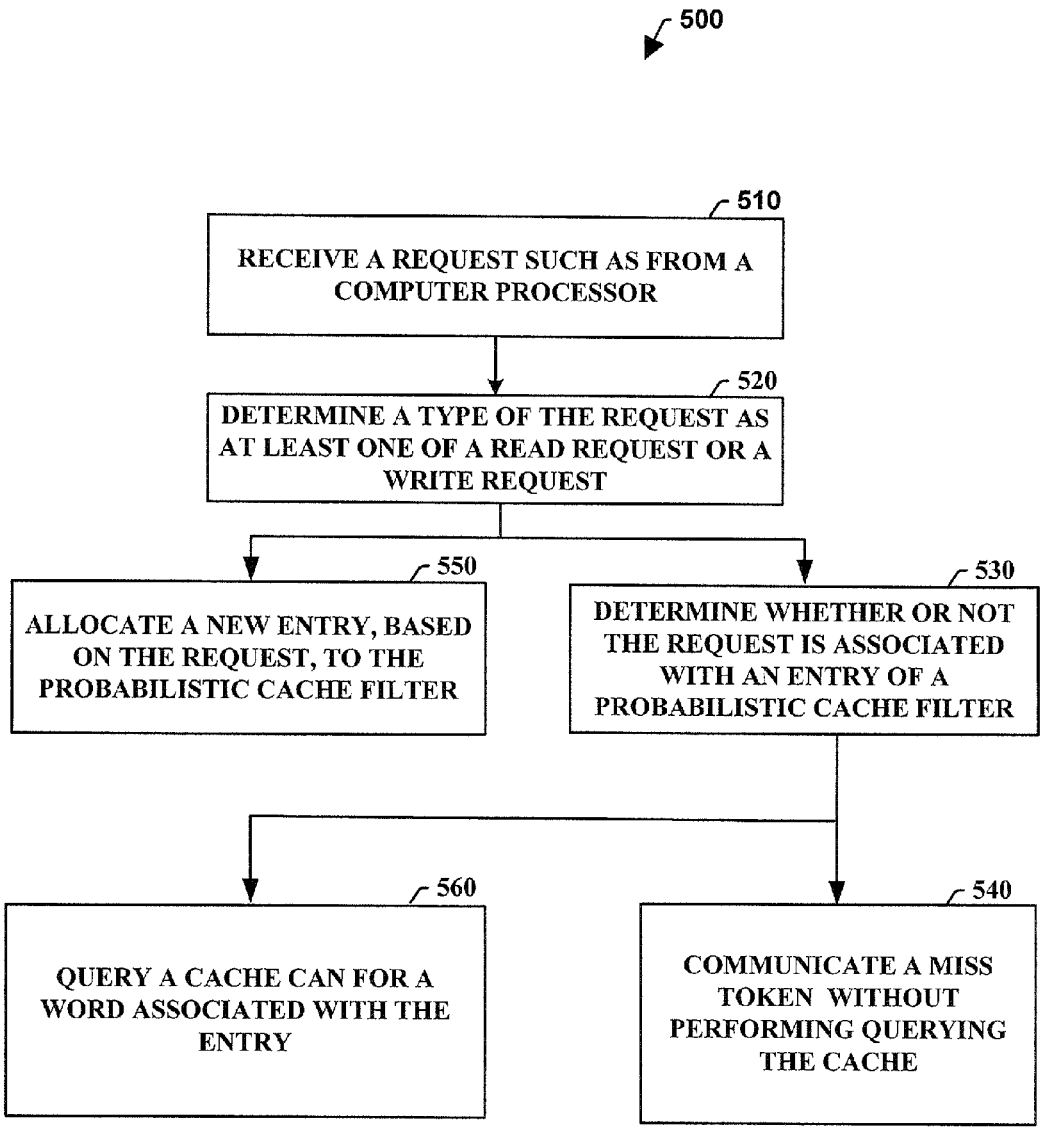
FIG. 5 illustrates an example methodology for cache miss detection in accordance with various aspects of this disclosure.
Figure 6:
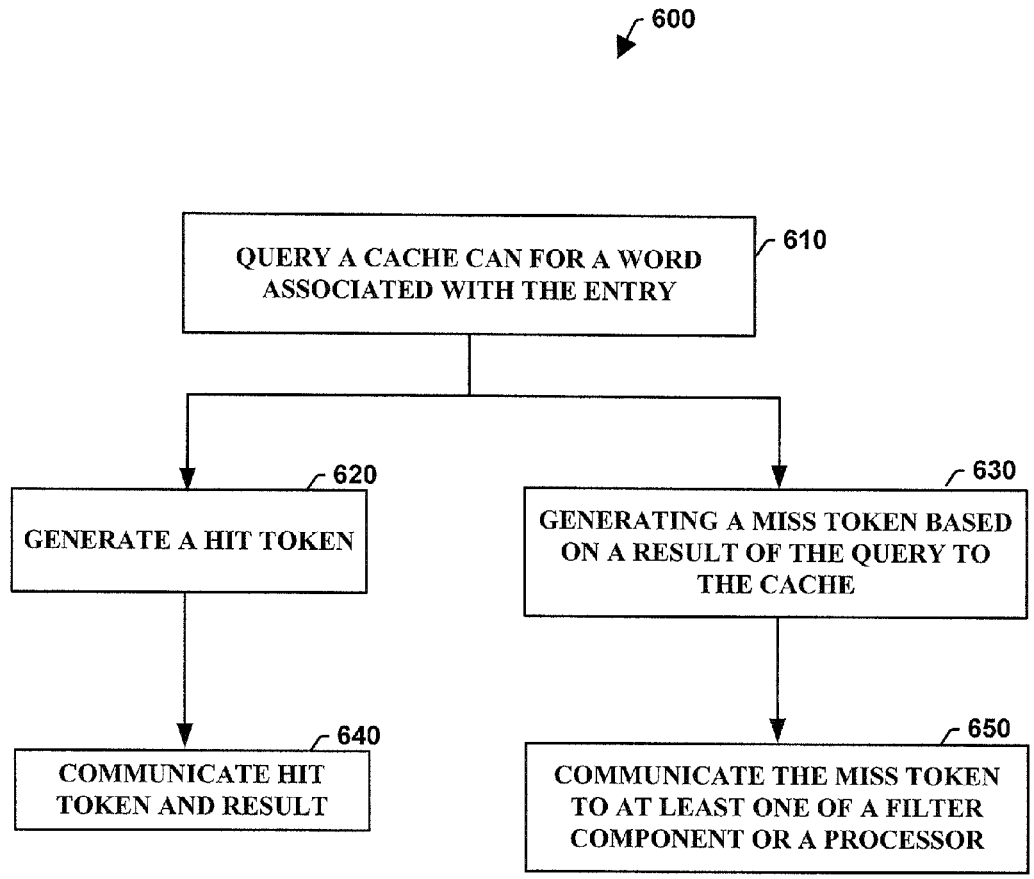
FIG. 6 illustrates an example methodology for cache miss detection including querying a cache in accordance with various aspects of this disclosure.

With reference to FIG. 5, there is illustrated a methodology 500 for detecting misses to a cache device upon, according to an aspect of this disclosure. As an example, various electronic devices, such as, but not limited to, memory storage systems, server systems, personal computers, cellular phones, consumer electronic and other electronic systems can utilize methodology 500. Specifically, methodology 500 detects a miss without the need to query a cache device(s) and/or without the need for additional hardware components.

At 510 a request is received, such as from a computer processor. The request can comprise instructions to read/write data from/to a cache. In an aspect, the request can be received by a filter component (e.g., the filter component 110, the filter component 310, and the filter component 410). It is noted that a request can be received from one or more computer processors.

At 520, a type of the request can be determined as at least one of a read request or a write request. In an aspect, bits in a request can be utilized (e.g., by a filter component) determine the type (e.g., headers, metadata, etc.). In an aspect, determining a write type request can bring method 500 to 550. In another aspect, determining a read type request can bring the method 500 to 530.

At 530, it is determined whether or not the request is associated with an entry of a probabilistic cache filter. For example, a probing component can probe (e.g., search, parse) a probabilistic cache filter for an entry associated with the request. In an aspect, an entry can also be determined based on hashing the request and/or a portion of the request. In an aspect, determining the request is not associated with the entry (e.g., an entry has a "0" in one position for array 210) can bring method 500 to 540. In another aspect, determining the request is associated with the entry (e.g., an entry has a "1" in every position for array 210) can bring the method 500 to 560.

At 540, a miss token can be communicated (e.g., when it is determined that the request is a read type and the request is not associated with the entry of the probabilistic filter). In an aspect, the miss token can be communicated (e.g., to a processor) without the need to query a cache and/or utilize other hardware. In an aspect, communicating the miss token without performing a cache lookup and/or utilizing other hardware can result in reduced power consumption, improved performance, and/or improved operating speeds.

At 550, a new entry can be added (allocated) to the probabilistic cache filter (e.g., the request is the write type). In an aspect, allocating a new entry can comprise setting a bit at each position of the entry to "1." While, allocating has been described with reference to an array of binary bits, it is noted that various other conventions can be utilized.

At 560, a cache can be queried (searched) for a miss word associated with the entry (e.g., a word comprised by the request). In an aspect, the request can comprise a request to read the word and the cache can comprise words computed earlier or duplicates of original values that are stored elsewhere, such as in main memory With reference to FIG. 6, there is illustrated a methodology 600 for detecting misses to a cache device upon, according to an aspect of this disclosure. As an example, various electronic devices, such as, but not limited to, memory storage systems, server systems, personal computers, cellular phones, consumer electronic and other electronic systems can utilize methodology 600. Specifically, methodology 600 detects a miss without the need to query a cache device(s) and/or without the need for additional hardware components.

At 610, a cache can be search (e.g., queried) for a word associated with the entry. For example, a system can determine a word may or may not be in a cache. The system can query the cache for the word. If the query results in finding the word, the method 600 can proceed at 620. If the query results in a miss, the method can continue at 630.

At 620, a hit token can be generated. For example, a system can generate a signal (e.g., a non-transitory computer readable signal) indicated the word was found.

At 640, the hit token and/or a result (e.g., data read from the word) can be communicated. In an aspect, the hit token and/or result can be communicated to various components in a system, such as a processor and/or a filter component.

At 630, a miss token (e.g., a non-transitory computer readable signal indicating a miss) can be generated based on a result of the query to the cache.

At 650, the miss token can be communicated to at least one of a filter component or a processor. In an aspect, the miss token can be communicated to various components in a system, such as a processor and/or a filter component.

Figure 7:
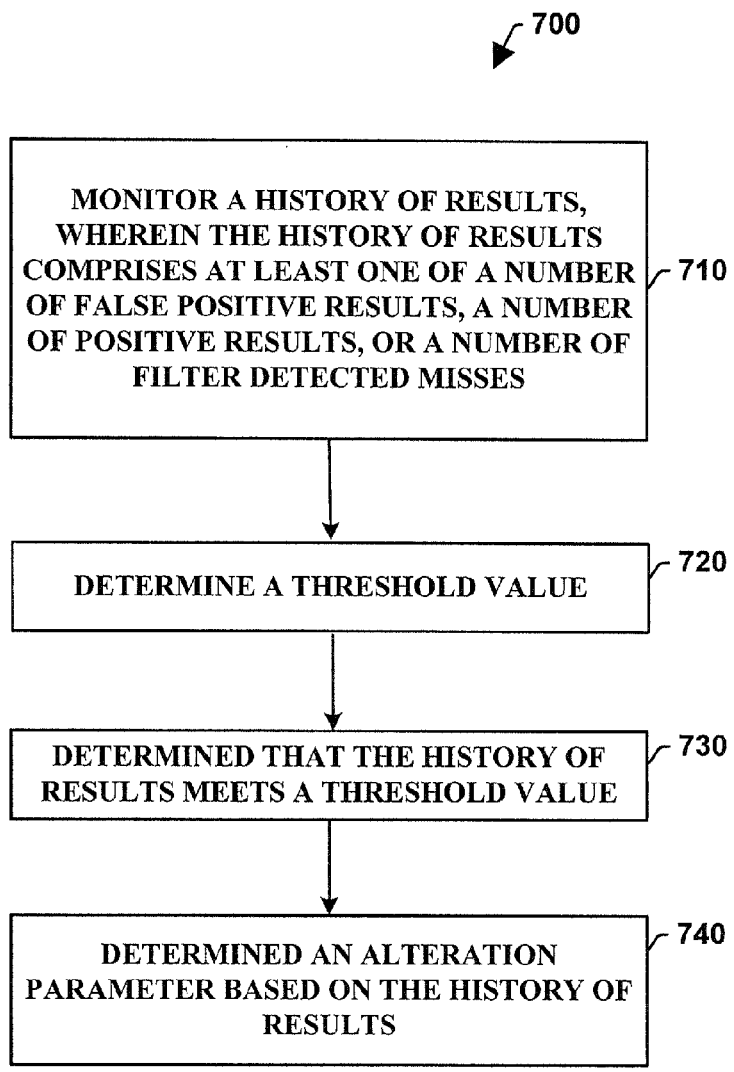
FIG. 7 illustrates an example methodology for cache miss detection including monitoring a history of results in accordance with various aspects of this disclosure.

With reference to FIG. 7, there is illustrated a methodology 700 for detecting misses to a cache device upon, according to an aspect of this disclosure. As an example, various electronic devices, such as, but not limited to, memory storage systems, server systems, personal computers, cellular phones, consumer electronic and other electronic systems can utilize methodology 700. Specifically, methodology 700 monitors a history of hits/misses without the need for additional hardware components.

At 710, a history of results can be monitored, wherein the history of results comprises at least one of a number of false positive results, a number of positive results, or a number of filter detected misses. In an aspect, a probing component can monitor the history of results and/or store the history, such as in a table. It is noted that the history can comprise words and/or entries associated with the hits/misses/false positive results.

At 720, a threshold value can be determined. In an aspect, the threshold value can be a frequency of false positive results based on entries, words, and/or a period. In another aspect, the frequency can be a count, and the like.

At 730, it can be determined whether or not the history of results meets a threshold value. As an example, a probing component can determine a metric derived from the history meets a threshold (e.g., a false positive threshold).

At 740, an alteration parameter, based on at least one of the history of results or the threshold, can be determined. It is noted that the alteration parameter can be a hash function and/or an entry to be altered. In various implementations, the alteration can be selectively determined based on at least one of the history of results or the threshold. For example, a system can determine the alteration parameter to minimize and/or reduce a total number of alterations needed and/or a total number of entries/hash functions need to be altered.

Figure 8:
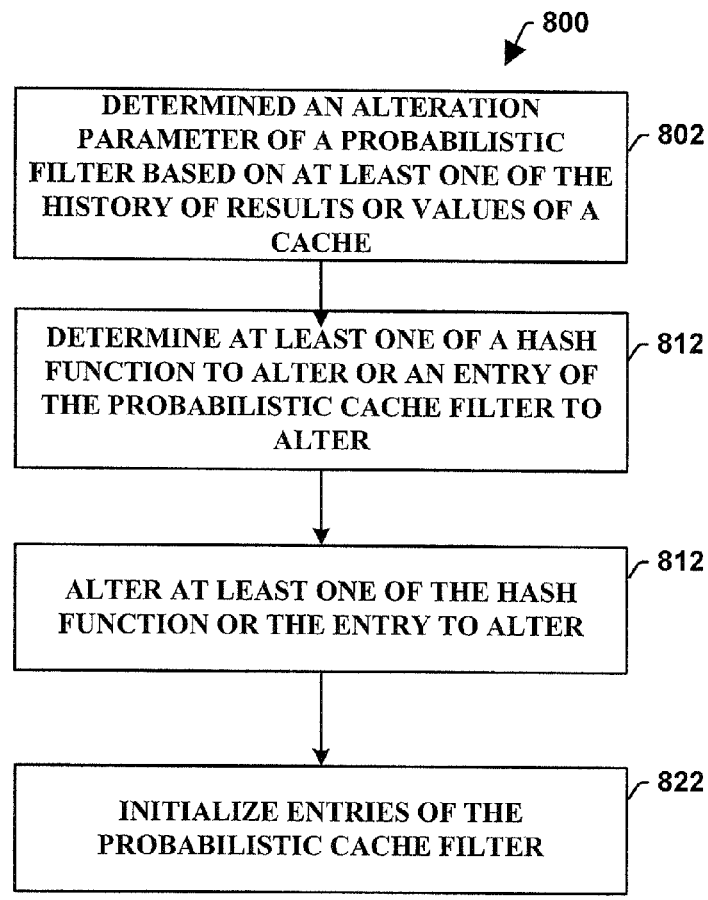
FIG. 8 illustrates an example methodology cache miss detection including altering a parameter accordance with various aspects of this disclosure.

With reference to FIG. 8, there is illustrated a methodology 800 for detecting misses to a cache device upon, according to an aspect of this disclosure. As an example, various electronic devices, such as, but not limited to, memory storage systems, server systems, personal computers, cellular phones, consumer electronic and other electronic systems can utilize methodology 800. Specifically, methodology 800 can update/alter a probabilistic filter based on a history of hits/misses such that the altered probabilistic filter can reduce a number of false positive results.

At 810, an alteration parameter based on the history of results can be determined. It is noted that the alteration parameter can be a hash function and/or an entry to be altered. In various implementations, the alteration can be selectively determined based on at least one of the history of results, the threshold, and/or values of a cache. For example, a system can determine the alteration parameter to minimize and/or reduce a total number of alterations needed and/or a total number of entries/hash functions need to be altered.

At 820, at least one of a hash function or an entry of the probabilistic cache filter can be selected and/or determine for alteration. In an aspect, a system can determine a hash function/entry to be altered and can determine a replacement hash function/entry.

At 830, at least one of the hash function or the entry can be altered. In an aspect, altering the hash function and/or entry can comprise replacing an entry and/or hash function.

At 840, entries of the probabilistic cache filter can be initialized. In an aspect, a system can read values from the cache and allocate the values to a probabilistic filter, in accordance with various aspects of this disclosure.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Figure 9:
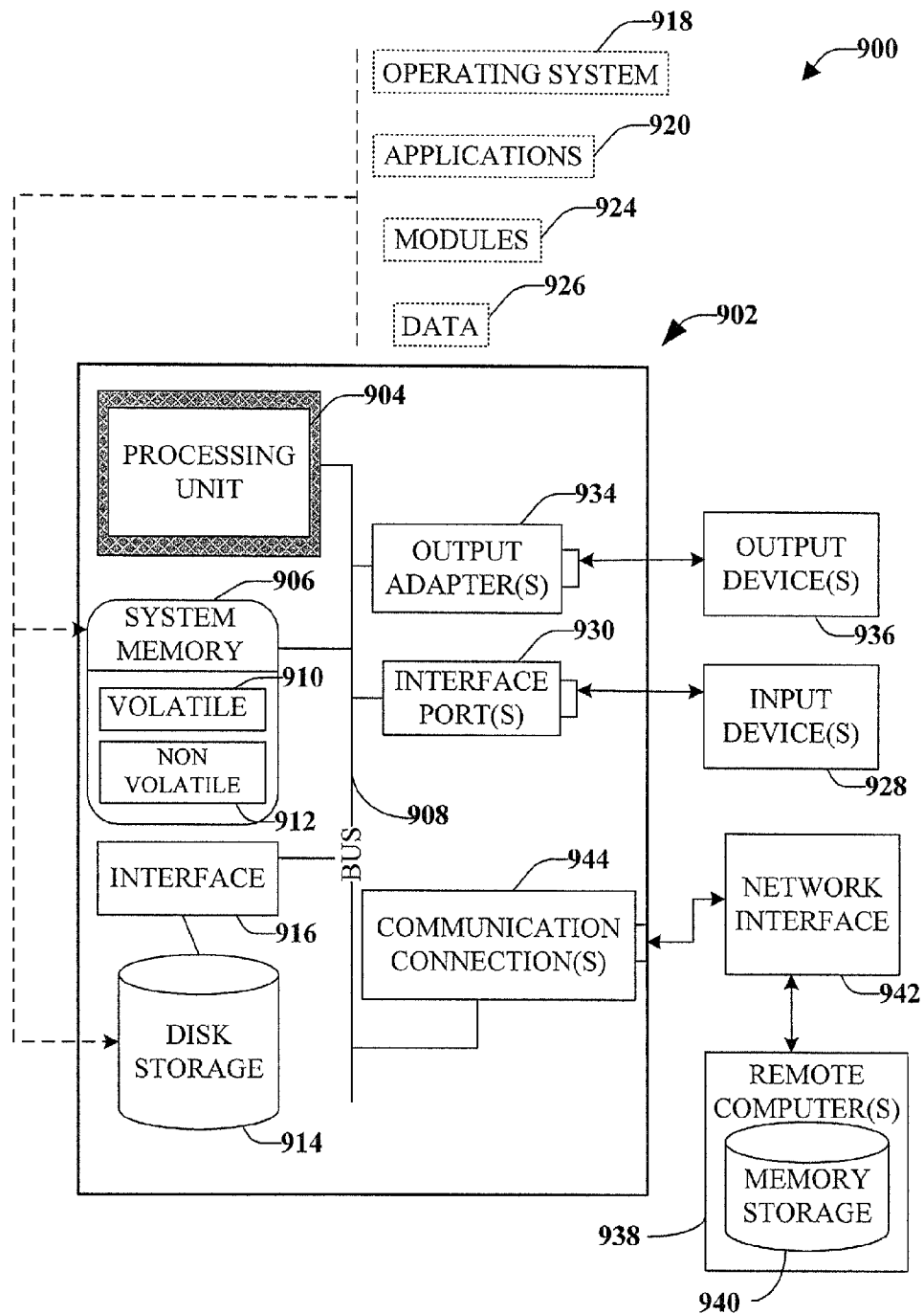
FIG. 9 illustrates an example schematic block diagram of a computing environment in accordance various aspects of this disclosure.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information. The client(s) 902 can include one more power management systems in accordance with aspects of this disclosure. For example, a client 902 can perform tasks and detect cache misses in a system.

The system 900 also includes one or more server(s) 904. The server(s) 904 can also be hardware or hardware in combination with software (e.g., threads, processes, computing devices). The server(s) 904 can house threads to perform transformations, for example. The server(s) 904 can also include various cache miss detection functions in accordance with this disclosure. One possible communication between a client 902 and a server 904 can be in the form of a data packet adapted to be transmitted between two or more computer processes wherein data may be accessed or stored in accordance with aspects of this disclosure. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one implementation, a client 902 can transfer data or requests to a server 904. Server 904 can store the data, perform requests, or transmit the data or request to another client 902 or server 904. At various stages, system 900 can implement cache miss detection systems in accordance with this disclosure. For example, the client(s) 902 and the server(s) 904 can each implement one or more cache miss detection systems in accordance with this disclosure.

Figure 10:
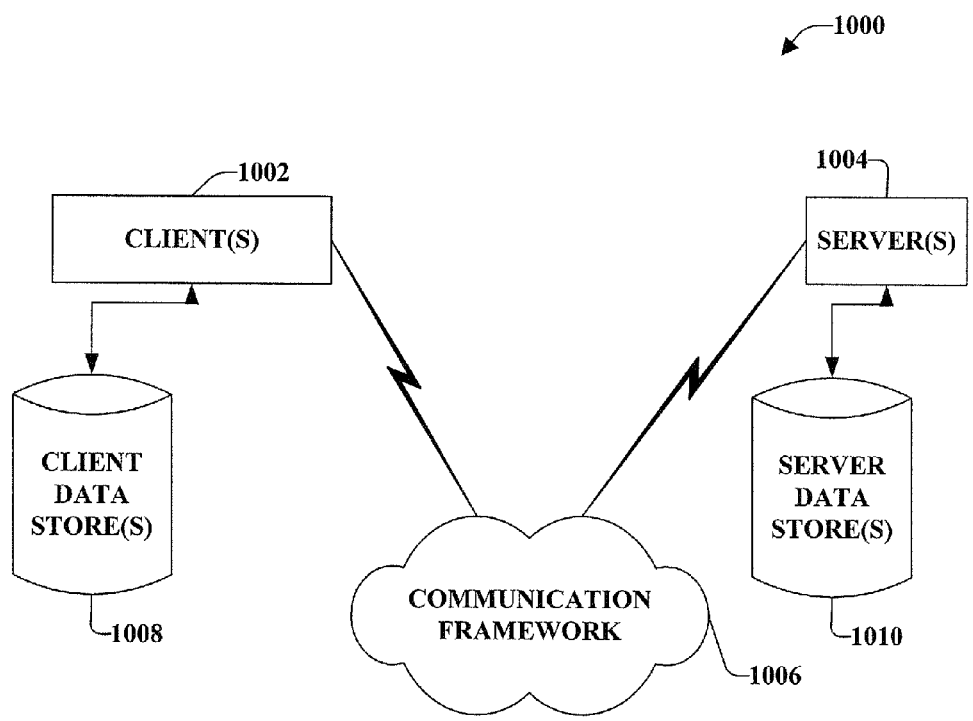
FIG. 10 illustrates an example block diagram of a computer operable to execute various aspects of this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 can include volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDRx SDRAM), and enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software, software in execution, hardware, and/or software in combination with hardware that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems. For example, applications 1020 and program data 1026 can include software implementing aspects of this disclosure.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s), optical devices, and/or mechanical devices in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible, including various systems and methods employing cache miss detection systems and/or methods. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

With respect to any figure or numerical range for a given characteristic, a figure or a parameter from one range may be combined with another figure or a parameter from a different range for the same characteristic to generate a numerical range.

Other than in the examples, or where otherwise indicated, all numbers, values and/or expressions referring to properties, characteristics, etc., used in the specification and claims are to be understood as modified in all instances by the term "about."

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., data storage and retrieval); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A device configured for managing cache access, comprising:
   a probabilistic cache filter component configured for receiving a request from at least a computer processor; and
   a probing component configured for:
      determining whether the request is at least one of a read request or write request;
      determining whether or not the request is associated with an entry of the probabilistic cache filter, when it is determined that the request is the read request; and
      communicating a miss token when it is determined that the request is the read request and it is determined that the request is not associated with the entry of the probabilistic cache filter.

2. The device of claim 1, wherein the probing component is further configured for communicating the request for a read of a cache when it is determined that the request is the read request and it is determined that the request is associated with the entry of the probabilistic cache filter.

3. The device of claim 2, wherein the probabilistic cache filter is further configured for altering a parameter associated of the probabilistic cache filter after the cache returns a hit token.

4. The device of claim 1, wherein the probing component is further configured for monitoring a history of results based on at least one of queries to the cache, miss tokens communicated without querying the cache, the entry, or values comprised in the cache.

5. The device of claim 4, wherein the probing component is further configured for determining whether of not the history of results meets a threshold.

6. The device of claim 1, wherein the probabilistic cache filter is further configured for allocating an entry in the probabilistic cache filter when it is determined the request is a write request.

7. The device of claim 1, further comprising an initialization component configured for initializing the probabilistic cache filter.

8. The device of claim 7, wherein the initialization component is further configured for initializing the probabilistic cache filter when a number of false positive results reaches a false positive threshold.

9. The device of claim 1, wherein the probabilistic cache filter is a Bloom filter.

10. The device of claim 1, wherein the entry consists of at least an address of a memory component of a cache.

11. A method of managing cache access of a system, comprising:
- receiving a request from at least a computer processor;
- determining a type of the request as at least one of a read request or a write request;
- determining whether or not the request is associated with an entry of a probabilistic cache filter, when it is determined that the request is a read type; and
- communicating a miss token when it is determined that the request is a read type and the request is not associated with the entry of the probabilistic cache filter.

12. The method of claim 11, further comprising communicating the miss token without performing a cache lookup.

13. The method of claim 11, further comprising searching a cache for a word based on the entry, when it is determined that the request is a read type and the request is associated with the entry of the probabilistic cache filter.

14. The method of claim 13, further comprising generating a miss token if the word is not found as a result of searching the cache.

15. The method of claim 14, further comprising altering at least one entry of the probabilistic cache filter when it is determined that a number of generated miss tokens reaches a threshold.

16. The method of claim 11, further comprising adding a new entry to the probabilistic cache filter when it is determined that the request is the write type.

17. A system for cache miss detection comprising:
- means for receiving at least one of request;
- means for determining a type of the request is at least one of a read or write type;
- means for determining whether or not an entry, associated with a read request, is comprised in a probabilistic filter; and
- means for communicating a miss token without performing a cache lookup when it is determined that the entry is not comprised in the probabilistic filter.

18. The system of claim 17 further comprising:
- means for searching the cache for a cache entry corresponding to the request.

19. The system of claim 18 further comprising means for monitoring a number of misses generated from searching the cache for the cache entry.

20. The system of claim 19 further comprising means for altering entries of the probabilistic filter based on the number of misses generated from searching the cache for the cache entry.

* * * * *